(12) United States Patent
Geyer et al.

(10) Patent No.: US 10,884,596 B2
(45) Date of Patent: Jan. 5, 2021

(54) HOUSEHOLD APPLIANCE COMPRISING AN OPERATING DEVICE CONFIGURED AS AN EXTERNAL OR INTERNAL TOUCHSCREEN

(71) Applicant: BSH HAUSGERAETE GMBH, Munich (DE)

(72) Inventors: Johannes Geyer, Haar (DE); Marcel Nero, Munich (DE); Christoph Ortmann, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 59 days.

(21) Appl. No.: 15/752,354

(22) PCT Filed: Aug. 5, 2016

(86) PCT No.: PCT/EP2016/068812
§ 371 (c)(1),
(2) Date: Feb. 13, 2018

(87) PCT Pub. No.: WO2017/036735
PCT Pub. Date: Mar. 9, 2017

(65) Prior Publication Data
US 2019/0004690 A1 Jan. 3, 2019

(30) Foreign Application Priority Data
Aug. 31, 2015 (DE) .......... 10 2015 216 629

(51) Int. Cl.
*G06F 3/0484* (2013.01)
*G06F 3/0482* (2013.01)
(Continued)

(52) U.S. Cl.
CPC ...... *G06F 3/04847* (2013.01); *A47L 15/0063* (2013.01); *D06F 29/005* (2013.01);
(Continued)

(58) Field of Classification Search
CPC ............ G06F 3/04847; G06F 3/04886; G06F 3/0482; D06F 2216/00; A47L 15/0063
See application file for complete search history.

(56) References Cited

U.S. PATENT DOCUMENTS 6,636,158 B1 * 10/2003 Bando ............... G01S 19/13
340/8.1
7,013,006 B1 * 3/2006 Tischer ............. H04M 1/72572
379/373.02
(Continued)

FOREIGN PATENT DOCUMENTS

CN 1938744 A 3/2007
CN 101299102 A 11/2008
(Continued)

*Primary Examiner* — Eric J. Bycer
(74) *Attorney, Agent, or Firm* — Laurence A. Greenberg; Werner H. Stemer; Ralph E. Locher

(57) ABSTRACT

A household appliance for treating objects has a control device and an operating device being a touchscreen. First and second adjustable control variables are displayed as flat touch-sensitive operating elements that are separated from each other on the touchscreen on at least two screen displays of different hierarchy. First adjustable control variables are treatment programs and second control variables are program parameters associated with the treatment programs. First operating elements are displayed on a hierarchically higher screen display with a hierarchy and are associated with treatment programs which are selected by touching an associated operating element. Second operating elements are displayed on hierarchically lower screen display and enable the program parameters to be adjusted. The hierarchically lower screen display follows the hierarchically higher screen display if a first operating element is selected by touch. The second operating elements have elongated sensor elements for adjusting the associated parameter value by touch.

18 Claims, 6 Drawing Sheets

(51) Int. Cl.
   *D06F 33/00*   (2020.01)
   *D06F 34/28*   (2020.01)
   *A47L 15/00*   (2006.01)
   *D06F 29/00*   (2006.01)
   *G05B 15/02*   (2006.01)
   *G06F 3/0488*  (2013.01)

(52) U.S. Cl.
   CPC .............. *D06F 33/00* (2013.01); *D06F 34/28* (2020.02); *G05B 15/02* (2013.01); *G06F 3/0482* (2013.01); *G06F 3/04886* (2013.01); *A47L 2301/08* (2013.01); *D06F 2212/02* (2013.01); *D06F 2214/00* (2013.01); *D06F 2216/00* (2013.01)

(56) References Cited

U.S. PATENT DOCUMENTS

| | | | |
|---|---|---|---|
| 9,235,306 B2 | 1/2016 | Lubert et al. | |
| 2002/0078511 A1* | 6/2002 | Blair | D06F 39/005 |
| | | | 8/159 |
| 2003/0206205 A1* | 11/2003 | Kawahara | G06F 3/0481 |
| | | | 715/854 |
| 2006/0190103 A1 | 8/2006 | Verkade et al. | |
| 2007/0107037 A1* | 5/2007 | Walter | H04N 5/44543 |
| | | | 725/135 |
| 2007/0256339 A1* | 11/2007 | Fryer | G01J 1/4204 |
| | | | 40/442 |
| 2008/0224848 A1* | 9/2008 | Meyer | G08B 17/10 |
| | | | 340/517 |
| 2012/0069364 A1* | 3/2012 | Kodama | G06F 3/04817 |
| | | | 358/1.9 |
| 2012/0286925 A1* | 11/2012 | Huang | G06F 3/048 |
| | | | 340/5.2 |
| 2012/0316984 A1* | 12/2012 | Glassman | G06Q 10/06 |
| | | | 705/26.7 |
| 2013/0290902 A1* | 10/2013 | Martin | D06F 39/005 |
| | | | 715/823 |
| 2014/0058553 A1 | 2/2014 | Lee et al. | |
| 2015/0345068 A1* | 12/2015 | Coffman | D06F 58/28 |
| | | | 715/771 |
| 2015/0362991 A1* | 12/2015 | Koga | G06F 3/0338 |
| | | | 715/810 |
| 2018/0202093 A1 | 7/2018 | Park et al. | |

FOREIGN PATENT DOCUMENTS

| | | |
|---|---|---|
| CN | 101853131 A | 10/2010 |
| CN | 102523395 A | 6/2012 |
| CN | 103685451 A | 3/2014 |
| CN | 104411873 A | 3/2015 |
| DE | 10035642 C1 | 12/2001 |
| DE | 10307756 A1 | 9/2004 |
| DE | 102010060295 A1 | 5/2012 |
| DE | 102011077902 A1 | 12/2012 |
| DE | 102011081331 A1 | 2/2013 |
| DE | 102012223779 A1 | 6/2014 |
| EP | 2706138 A1 | 3/2014 |
| EP | 2883990 A1 | 6/2015 |
| RU | 2013107394 A | 8/2014 |
| RU | 2013157509 A | 7/2015 |
| WO | 2012175523 A1 | 12/2012 |
| WO | 2013026734 A1 | 2/2013 |
| WO | 2014124105 A2 | 8/2014 |

\* cited by examiner

HOUSEHOLD APPLIANCE COMPRISING AN OPERATING DEVICE CONFIGURED AS AN EXTERNAL OR INTERNAL TOUCHSCREEN

BACKGROUND OF THE INVENTION

Field of the Invention

The invention relates to a household appliance with an operating facility configured as an external or internal touchscreen. The invention relates in particular to a household appliance for treating objects, having a control facility and an operating facility configured as an external or internal touchscreen, the control facility being designed to display first and second settable control variables of the household appliance as demarcated, flat, touch-sensitive operating elements on the touchscreen on at least two screen displays B1, B2 of different hierarchy. The invention also relates to a method for operating such a household appliance.

In recent years the use of a touch-sensitive operating facility has gained increasing favor for the purpose of operating numerous devices such as computers and smartphones. Such a touch-sensitive operating facility, which combines a display apparatus with an operating unit and is also referred to as a touchscreen in the following, in principle allows easy and fast operation of the device in question.

In the meantime household appliances with a touchscreen have also become known.

DE 10 2011 081 331 A1 and WO 2013/026734 A1 describe a household appliance with a touch-sensitive operating and display facility, which has a display unit for displaying operating information and a transparent support part, on which at least one capacitive sensor electrode is arranged as part of a touch capacitor, being arranged to overlap with the display unit and to overlap with a touch-sensitive actuation surface of the operating and display facility, the at least one sensor electrode being configured from a transparent and electrically conductive lacquer or adhesive, which contains in particular carbon nanotubes.

DE 10 2011 077 902 A1 describes a capacitive operating and display facility for a household appliance, with a display window with a touch-sensitive operating surface, a display symbol being positioned on the display window, with at least one light-emitting element for emitting light to back-light the display symbol, and with a capacitive sensor electrode as part of a touch capacitor, which is arranged at a distance from the operating surface so that a capacitance of the touch capacitor can be changed when the operating surface is touched, the sensor electrode being arranged on a printed circuit board and an element configured from an elastic, electrically insulating material being arranged between the operating surface and the sensor electrode.

DE 10 2012 223 779 A1 describes a household appliance with a control facility, an at least partially light-permeable aperture and with an at least partially light-permeable operating panel with at least one capacitive sensor for a user to select a program function of the household appliance, the operating panel having a plastic component made up of a number of layers, comprising (a) a display film; (b) a touch-sensitive film, which has the at least one capacitive sensor and electric conductor tracks; and (c) a structured light guide layer; the plastic component being able to be produced by connecting a self-adhesive display film to the touch-sensitive film and then back-injecting the structured light guide layer.

WO 2012/175523 A1 describes an operating and display facility for a household appliance, capacitive sensor electrodes being arranged to overlap with the touch-sensitive actuation surface and a separate capacitive sensor electrode being assigned respectively to at least some function characters to which a value of a parameter of an operating process of the household appliance is assigned, said sensor electrode being arranged to overlap with the function character assigned to it, so that a capacitance of a touch capacitor having one of the sensor electrodes can be changed by touching the actuation surface in a region overlapping with said sensor electrode.

DE 10 2010 060 295 A1 describes a program-controlled household appliance with an operating and display apparatus (interface), which has a touch-sensitive display surface (touchscreen), in which programs and program parameters can be displayed, it being possible for these to be selected and/or changed by a user touching corresponding operating and display fields, with a display surface with an operating and display bar (status bar) extending over its width for displaying and selecting status information in adjacent operating and display fields; an operating and display field (work region) extending below the status bar for displaying programs, program parameters and program information and for selecting and changing (operating actions) programs, program parameters, it being possible for operating and display fields to be displayed in a variable manner adjacent to one another and/or above one another within the work region; and an operating and display bar (navigation bar) extending below the work region, it being possible for operating and display fields for selecting, confirming or deleting operating actions to be displayed adjacent to one another within the work region.

DE 103 07 756 A1 describes a method and an operating apparatus for setting a programmable household appliance, in particular for creating operating programs for example for washing machines, washer/dryers, tumble dryers, electric ovens and dishwashers, the switching operations to be performed by the user when selecting programs and parameters taking place essentially by way of an operating element and the information intended for the user during the programming operation and during the program run and after the end of the program being output by way of a display element.

DE 100 35 642 C1 describes a laundry treatment appliance such as a washing machine, washer/dryer or tumble dryer with a program control facility and an operating surface for cursor-aided user guidance during program selection and program configuration with a display facility for program information and with an operating facility with program function keys and with a multifunction rotary selector with selection function, which can be used to select the operating programs and program parameters that can be displayed in clear text in the display facility, the display facility being configured as a freely definable display with graphics capability for cursor-aided navigation using the operating facility by means of hierarchically structured display levels with dialog windows and display windows of different display formats, the operating facility being configured for equal and/or context-related access to the display content of the dialog windows and display windows as a function of the display level by way of the multifunction rotary selector or the program function keys and it being possible for operating programs and program parameters to be selected or defined with user guidance in the dialog windows by way of the program function keys and/or the multifunction rotary selector of the operating facility and for program information to be displayed in the display windows. In this process a selected or defined operating program should be put into operation using a program start key assigned separately to the operating facility.

WO 2014/124105 A2 describes a laundry treatment appliance comprising: a monitoring facility, which is configured to control the operation of at least one operational component associated with the laundry treatment appliance; and a touchscreen user interface which communicates with the monitoring facility, the monitoring facility responding to at least one user selection by way of the touchscreen user interface to control the operation of the at least one operational component, the touchscreen user interface having a display screen to display a series of wash program symbols, each wash program symbol being assigned to a corresponding wash program, which can be implemented by the monitoring facility. The series of wash program symbols can be scrolled through in opposing first and second scrolling directions by way of the display screen, it being possible for each wash program symbol to be selected individually as at least one user selection by way of a user touch interaction with the touchscreen user interface and a wash program symbol selected from those displayed being centered and enlarged within at least a part of the series of wash program symbols to display the selection of the one wash program symbol selected from those displayed.

However control of a household appliance by way of a touchscreen can be very problematic if the number of possible programs and setting options for parameters is very large. This is particularly so for household appliance for treating objects such as laundry, dishes and food. When the hierarchy of programs and setting options is complex a user of the household appliance can easily become confused and lose track of the control process. This is the case in particular when there are also a lot of individual setting options for specific program stages. However the possibility of inputting optimum settings itself can allow very efficient and convenient operation of a household appliance. In addition to more efficient operation of the household appliance in respect of the consumption of energy and materials used, such as water, detergent, etc., operation can also be made particularly user-friendly if it is possible to input optimum settings.

The size of the touchscreen however limits the range of movements that can be used to set parameters and also limits the number of parameters that can be set using a touchscreen. This frequently requires an extensive hierarchy of menus and windows for setting parameters to be used for a program to be performed in the household appliance. This slows down program control or a perhaps rather impatient user presets non-optimized procedures so the operation of the household appliance is not optimum. It is therefore desirable to operate household appliances in an improved and simplified manner that is designed to utilize the entire range of programs and options.

EP 2 883 990 A1 (D1) describes a washing machine control display device and a washing machine fitted with such. The washing machine control display device comprises a touch panel which has a liquid crystal panel for displaying a selection key for an operation course for determining operating conditions for washing and drying and for setting conditions for washing, rinsing and spinning; and a transparent panel, containing a transparent electrode, wherein the transparent panel is superposed on the liquid crystal panel and the touch panel is designed to perform the operation by touching the transparent panel with a finger and is fitted with a description display screen for describing details of the operation course. The description display screen is fitted with an operation course setting switch so that the liquid crystal panel displays the setting conditions and the setting switches.

FIG. 7A to FIG. 7F in EP 2 883 990 A1 illustrate screen displays, wherein a user changes a screen or settings by touching with a finger. FIG. 7A in EP 2 883 990 A1 shows a first screen, when the appliance has been switched on, with setting switches inter alia for selecting a wash and/or drying mode. When a setting switch is touched, a switch is made to the screen in FIG. 7B in EP 2 883 990 A1, on which for example a preset duration of a wash stage is indicated for example on an operating element. If this operating element in EP 2 883 990 A1 is actuated, the screen shown in FIG. 7C of EP 2 883 990 A1 appears, on which a user can set a desired temperature value by sliding using an elongated sensor element displayed therein.

SUMMARY OF THE INVENTION

Against this background it was the object of the present invention to provide a household appliance for treating objects that can be operated more easily. Safety should preferably also be improved when operating the household appliance. A method for operating said household appliance should also be provided.

According to the present invention said object is achieved by a household appliance for treating objects (hereafter also shortened to "household appliance") and a method suitable for its operation having the features of the corresponding independent claims. Preferred embodiments of the inventive household appliance and of the inventive method are set out in the respective dependent claims. Preferred embodiments of the inventive method correspond to preferred embodiments of the inventive household appliance and vice versa, even if this is not specifically stated.

The invention therefore relates to a household appliance for treating objects, having a control facility and an operating facility configured as an external or internal touchscreen, the control facility being designed to display first and second settable control variables of the household appliance as demarcated, flat, touch-sensitive operating elements on the touchscreen on at least two screen displays B1, B2 of different hierarchy, first settable control variables being treatment programs for the objects and second control variables being program parameters with changeable parameter values assigned to the treatment programs, with first operating elements assigned to treatment programs which are selected by touching an assigned first operating element being displayed on a hierarchically higher screen display B1 with a hierarchy H1 and second operating elements that allow the setting of the program parameters being displayed on at least one hierarchically lower screen display B2 with a hierarchy H2<H1, the hierarchically higher screen display B1 being followed indirectly or directly by the hierarchically lower screen display B2 when a first operating element is selected by touching and at least a part of the second operating elements having elongated sensor elements, in the longitudinal direction of which an assigned parameter value changes continuously or non-continuously so that the parameter value can be set by touching the elongated sensor element, and the control facility is designed in such a manner that touching a first operating element between the screen displays B1 and B2 results in a screen display B3, on which at least some of the program parameters and their unchangeable or changeable parameter values are displayed on third operating elements, with the screen display B2 resulting directly or indirectly when a third operating element assigned to a changeable parameter value is touched and the control facility is also configured to allow the direct start of a treatment program on the screen display B1, in that a sub-region of a first operating element provided for this purpose is touched.

"Hierarchy" in the context of the invention means in particular the sequence of the arrangement of screen displays. For example a screen display with a higher hierarchy is displayed first. Touching operating elements on a screen display with a higher hierarchy then results in the showing (also referred to as "opening") of a screen display with a lower hierarchy. Screen displays can follow one another directly, in other words without a further screen display in between, or indirectly, in other words with one or more screen displays in between.

The term "touching" should be interpreted broadly, in that it includes all touching with an external input unit that can be converted to an electrical signal, which can also be referred to as a "touch signal". According to the invention an external input unit can be for example a user's finger and/or a pen. Touching can therefore be performed quite generally using an input unit. The external input unit serves to generate touch signals on the touchscreen, touch signals generally comprising movements such as for example pressing, dragging, swiping and/or rotating.

The term "treatment programs" should be interpreted broadly. According to the invention treatment programs comprise programs that can be performed as standard in a household appliance, the parameters of which are stored beforehand as default values in the control facility, known as standard treatment programs, as well as treatment programs with additional options, in other words with program parameters modified by a user compared with standard settings. Additional options can include presettings such as a delayed start, a program sequence designed to comply with other presettings such as speed, in a washing machine for example the fastest possible wash program or a wash program designed for energy efficiency, a hygiene stage or for example a wash program tailored to individual soiling, for example blueberry or red wine stains.

In one embodiment of the inventive household appliance it is also preferable for dependencies between program parameters and/or additional options to be stored in the control facility, preventing disadvantageous inputting or inputting that might even result in damage of combinations of parameter values for different parameters or other inputs by a user. The parameter values that cannot be selected are then preferably displayed in a visually less prominent manner on the touchscreen and their selection is blocked by the control facility.

The control variables can also include "operating statuses", the term "operating status" being interpreted broadly. The term "operating statuses" thus includes both the result of a switching on or off operation and a standby mode of the household appliance as well as different stages of a performed treatment program and/or a special operating status. According to the invention a special operating status is in particular an operating status resulting from a malfunction of the household appliance, for example a failure of a drain pump in a washing machine and/or a faulty fresh water supply valve. A special operating status is determined as a function of the type of household appliance, for example it can be incorrect operation of the household appliance, for example excessive foam generation in a water-conducting household appliance or too high temperatures in a cooking appliance.

According to the invention control variables are generally displayed on the touchscreen by displaying operating elements in the form of text, comprising letters, numerals and special characters, and/or image. A display in the form of an animation is also advantageous. The term "animation" here is used broadly and not restricted specifically. According to the invention it comprises all types of dynamic displays, for example simple flashing sequences, moving patterns, images and/or text, or for example even video sequences.

In some embodiments of the inventive household appliance, for example in the case of a washing machine, a preset standard program for washing cotton laundry items can be displayed to a user on the touchscreen both by the term cotton and by an image of a cotton plant. It can also be displayed by combining the term cotton with the image of a cotton plant. It is also possible to display the cotton plant as an animation, for example a rotating cotton plant. Also a temperature can preferably be displayed for example in a washing machine or tumble dryer by the word temperature and/or a thermometer and/or the unit "° C.". It is also possible for the thermometer to be displayed as an animation, for example with the temperature displayed as alternately rising and falling. According to the invention long and/or cumbersome terms in particular can preferably be displayed using images, for example "delayed start time" with a clock or "ecological" with a leaf, "energy efficiency" with a plug or "food preparation" with cutlery.

In further embodiments of the inventive household appliance operating statuses for example can also be displayed to a user on the touchscreen using text, image and/or animation. Different displays for operating statuses, for example program progress stages, are particularly preferable here. For example a wash phase of a wash program can be displayed differently from a spin or rinse phase. It is particularly preferable to display program progress stages in the form of an animation. It is conceivable for example for different program progress stages to be displayed for example by different movement forms. For example the pattern can be a wave pattern that moves to and fro when a wash program is in a wash phase in a water-conducting household appliance embodied as a washing machine. The wave pattern can be displayed rotating when the washing machine is spinning and can move horizontally across the touchscreen when the wash program is in the rinse phase.

It is also possible in particular for different program progress stages to be displayed using different animation speeds, in particular different drum rotation speeds can be visualized advantageously in this manner, in that the animation speed changes according to the drum rotation speed, preferably with increasing rotation speed.

In a further embodiment of the inventive household appliance individual program progress stages can however also be displayed differently for example by loading different video sequences. Visual differentiation of program stages generally has the advantage for the user that program progress stages can also be identified easily at a distance from the household appliance, thereby allowing fast and reliable monitoring of the operation of the household appliance.

In one particularly preferred embodiment of the inventive household appliance special operating statuses of the household appliance can also be output to a user by way of the touchscreen. The displays here can be in the form of text, image and/or animation. The control facility is designed in such a manner that when a special operating status is present, information about the type of special operating status and/or a warning is/are output to a user. In a simple embodiment the information and/or warning here can appear as text on the touchscreen, for example water supply faulty. It can also be in the form of an image and/or animation. For example text and/or image could flash continuously at a specific frequency or a video sequence could be shown indicating an alarm situation. This allows a user to identify a special operating status easily and intuitively even at a distance from the household appliance, thereby allowing a higher level of operating safety.

In a further preferred embodiment of the inventive household appliance a switching on operation, a switching off operation and/or a standby mode of the household appliance can be output to a user by way of the touchscreen in the form of text, image and/or animation. For example the expression "Hello" can appear during the switching on operation, the expression "Goodbye" during the switching off operation and/or the expression "Pause" in standby mode. The display can also be in the form of an image for example. The company logo can appear during the switching on operation and/or can disappear during the switching off operation. It is also possible for video sequences to be displayed, conveying a greeting, farewell and/or standby situation to the user.

The type of display is not restricted by the invention. It can be in black and white, gray scale and/or color. In particular the display can preferably also have a color logic. For example operating elements selected by a user, in other words in particular treatment programs, program parameters and parameter values, can be highlighted brightly and/or in a first color and treatment programs, program parameters and parameter values that are not selected and/or cannot be selected are displayed dark and/or less dominantly in a second color. This allows greater clarity and a user can easily complete an already actuated selection.

The type of images and animation for displaying control variables is not restricted by the invention. The displays can be for example abstract and/or realistic and context-related, in other words for a specific treatment program, a specific operating status and/or a specific program parameter. However they can also be independent of context, for example simply serving to differentiate. A user-specific display and/or color selection is also possible. In one embodiment of the inventive household appliance display packages with different layouts for the touchscreen are stored in the control facility, a user being able to select from these at will.

Such a display package for the touchscreen comprises for example the colors black, white and blue, as well as different gray scales. The touchscreen background for an overview display can be black for example and it can be white for a surface in which a setting is input, for example a temperature setting. Depending on priority text can be displayed highlighted in white and/or black and/or displayed less dominantly in gray. For example program designations, such as Cotton or Sport, and already selected operating functions can be displayed in white and/or black and those that are not selected and/or cannot be selected can be displayed in gray. Images and animations can also be displayed in blue and/or white. For example an image of a cotton plant in blue can be displayed to reinforce Cotton in text.

In a further preferred embodiment the control facility is also designed in such a manner that the performance of a treatment program and/or the transition between two program stages is displayed by means of acoustic and/or visual signals.

An inventively preferred household appliance therefore has a sound generator and a speaker for generating and playing acoustic signals related to the treatment programs. It is also possible to convey an acoustic effect, e.g. pressing a key, on a touchscreen by a sound in combination with a touch.

The type and configuration of the speaker as well as its position are not restricted by the invention. It can be positioned in such a manner that it is visible or be integrated in the household appliance in such a manner that it is not visible to a user. At least one sound and/or sound sequences, which are assigned to a touch signal and/or an operating status, for example a performed program, a switching on/off operation or a transition between two program stages, is/are also stored in the control facility of the household appliance. For example when a user touches an operating element, a sound can be output simultaneously by the control facility, conveying the effect of pressing a key. A specific sound can also be assigned to the switch from a screen display B1 to a screen display B2 and/or B3. In a further embodiment of the inventive household appliance it is preferable in particular for sound sequences also be assigned to a touch signal and/or an operating status, for example a performed program, a switching on/off operation or a transition between two program stages, in the control facility. For example a switching on operation and/or a switching off operation can be conveyed to a user acoustically by an assigned sound and/or sound sequence. It is also preferable in particular for a special operating status to be conveyed acoustically to a user, for example by means of a warning signal. This allows a user to be informed of the presence of a special operating status even when said user is not in the room where the household appliance is installed. Also the switch between individual program stages can be conveyed acoustically by a sound and/or sound sequence. A user can thus monitor the operation of a household appliance even when said user is not in the room where the household appliance is installed.

According to the invention it is preferable in particular for the performance of a treatment program to be displayed on the touchscreen by an image, in particular an animation, that changes over time, an assignment between the treatment programs and the changing image displays being stored in the control facility.

The control facility is preferably configured in such a manner that a frequency and/or intensity of the acoustic and/or visual signals is a function of the type of program stage performed and/or a transition between two program stages, a relationship between the frequency and/or intensity of the acoustic and/or visual signals and the type of program stage performed and/or a transition between two program stages being stored in the control facility.

In preferred embodiments of the invention the touchscreen is designed to convey a haptic effect when touched. This can be achieved for example by vibration in combination with a touch signal and/or an appropriate surface modification, for example by way of depressions such as grooves or round depressions tailored to the size of a finger, allowing a haptic effect to be conveyed. The type and intensity of the haptic effect here can be a function of a treatment program, program parameter and parameter value assigned to an input surface. As further input surfaces can also be provided in other embodiments of the invention, for example an on/off switch, these can also be assigned specific haptic properties.

In a preferred embodiment of the inventive household appliance the operating facility of the household appliance can therefore also be designed to generate vibrations. A vibration signal or vibration sequences is/are then stored in the control facility, assigned to specific touches. For example in the case of a touch signal in the form of touching or pressing on the touchscreen, the control facility can initiate a vibration, conveying the effect of a key press to a user.

In a preferred embodiment of the household appliance combinations of a visual, acoustic and haptic display of treatment programs, program parameters and parameter values are also possible by way of the touchscreen.

According to the invention the hierarchically higher screen display B1 is followed indirectly or directly by the hierarchically lower screen display B2, when a first operating element is selected by touching, and at least a part of the second operating elements have elongated sensor elements, in the longitudinal direction of which an assigned parameter value changes continuously or non-continuously so that the parameter value can be set by touching the elongated sensor element. In principle there are two options for use here. With a first option an essentially spatially fixed touch with an operating unit, in particular a finger, in other words no dragging or lateral movement, can be evaluated as a point-type touch. A specific parameter value is then generally assigned to the location of the point-type actuation, being set as a result. With the second option provision is made for a finger to be positioned and in principle moved in a dragging movement along the elongated sensor element for actuation. Actuation here therefore goes beyond a point-type touch. A corresponding parameter value is set as a function of the length and/or starting point and end point of the actuation or the elongated dragging movement. The elongated sensor element here can be in particular a segmented slider that can be displaced by touching, it being possible for the segments per se to be visible to a user or to follow one another continuously.

In one specific example a slider can appear blue for example, when a value is selected, e.g. a temperature of 60° C., and can appear white, when a limit value of a parameter is selected, e.g. "Cold". This allows all inputs with a higher priority for a user to be displayed in strong colors and all the operating functions of low priority for a user to be displayed in weaker colors. Such a color logic allows the complexity of the information displayed on the touchscreen to be reduced and operation by a user to be simplified. Safety can also be improved when selecting treatment programs, program parameters and parameter values, as the selected options differ visually from those that are not and/or cannot be selected.

Generally the number of treatment programs and parameter values is large, particularly in a water-conducting household appliance. Generally an operating facility designed as a touchscreen restricts the region in which treatment programs and parameter values can be displayed clearly. According to the invention therefore the touchscreen has at least two screen displays, preferably more than two screen displays. Generally the number of screen displays will be determined by the type of household appliance and the control variables provided therein. For example in a simpler and lower-cost variant of the household appliance the number of screen displays will generally be lower, as fewer control variable are preset. In a comparatively expensive household appliance with a plurality of operating functions in contrast the number of screen displays will be higher, as more control variables have to be displayed.

Generally a switch from one screen display to a second screen display and/or navigation within a screen display can be continuous and/or non-continuous.

According to the invention the configuration of the operating elements within a screen to subdivide the touchscreen is not restricted. It is generally based on the treatment programs and program parameters to be displayed, an offered option of immediate program start and/or parameter input, for example by touching and opening a further screen display. For example standard programs are generally displayed in the form of a list with regularly distributed surface segments. For the further determination of a treatment program or program parameter selected by a user, for example for setting a temperature, the surface subdivision will preferably be weighted in favor of said treatment program or program parameter. In other words the operating element or surface assigned thereto, in which for example the temperature and its setting options are displayed, will generally be given the largest percentage area to allow the greatest possible clarity and easy user operation. Other operating functions that are not selected are therefore displayed in a smaller surface area and/or masked out.

The shape of an operating element within the screen display is not restricted by the invention. An operating element can be rectangular or round for example or can have a more complex shape.

Generally a user can select and/or set treatment programs and program parameters in a user-defined manner by touching the touchscreen. In a preferred embodiment of the inventive household appliance the control facility therefore has a data storage unit, in which user-defined settings are stored and from which they can be retrieved again for further performance in a household appliance. To this end when setting has been completed, a user can touch an operating element with an image in the form of a star and/or a storage medium, displaying the function "Add to favorites". The display can also be animated.

The touchscreen can be implemented in different ways, as long as a touch can be converted appropriately to electrical signals. In particular the type and structure of the touchscreen are not restricted by the invention. Any touchscreen can be used, which is suitable for showing information in the form of text, image and/or animation and for converting touches to analyzable signals.

The touchscreen preferably comprises a display with a cover disk and a touch film arranged between the display and the cover disk. According to the invention the touchscreen is also touch-sensitive in at least two directions. A touch element here can be configured as touch-sensitive all over or just in sub-regions. A touch element can also be subdivided into a number of independently touch-sensitive sub-areas. In this way it is possible for example to touch a first touch element assigned to a treatment program to start the treatment program directly when a first sub-area is touched or to modify the program parameters of the treatment program when a second sub-area is touched with a further screen display being shown as a result.

The type of display on the touchscreen of the household appliance is not restricted by the invention. For example an LCD, LED, OLED or AMOLED display can be used. This allows operating elements or sub-regions thereof to be highlighted and/or suppressed visually by specific backlighting and/or a different color, "highlighted visually" meaning a particularly strong contrast with the display background and "suppressed visually" meaning a particularly weak contrast with the display background.

The material and configuration of an optionally used cover disk are also not restricted by the invention. In a preferred embodiment of the inventive household appliance however a plexiglass cover disk is used. Plastics such as plexiglass in particular have the advantage, compared with glass for example, of being easier to shape, so that even touchscreens with a shape that is not flat can be produced relatively easily, for example with concave or convex curvature. The plexiglass cover disk here is color-tinted, particularly preferably being tinted black. This allows the transparency of the cover disk to be adjusted so that components of the touchscreen below it that should not be visible are not visible to a user. In some embodiments of the inventive household appliance the cover disk can also exceed the dimensions of the touchscreen in height and/or width. This allows a plexiglass operating panel with an integrated touchscreen to be created.

The touch film is also not restricted by the invention, as long as it can convert touches by an external input unit to signals, which can be processed by the control facility to control the household appliance.

It is however preferable for touch switches with capacitive sensor elements to be used in a capacitive manner as operating elements.

In a preferred embodiment of the inventive household appliance the touch film is therefore a capacitive touch film. The capacitive touch film here preferably comprises at least one sensor electrode which can generate an electric signal produced by changing the electrical capacitance when an external input unit approaches and/or makes contact. The touch film particularly preferably has a grid of sensor electrodes. An insulating material, referred to as a dielectric medium, is generally present between the sensor electrodes. The capacitance at the crossing points of the sensor electrodes is generally detected by a circuit. According to the invention the electrode grid can be configured by applying a structured, electrically conductive material. The structure can have many different types of simple geometric shape, such as circles, rectangles, etc., or even complex irregular shapes, but lines in the X and Y directions are also possible. The electrically conductive material is preferably transparent, for example indium tin oxide (ITO). However transparent and conductive lacquers and/or adhesives can also particularly preferably be used. The latter have the advantage in particular that they can be applied more easily to shaped surfaces, for example convex or concave surfaces, without loss of functionality. Conductive lacquers and/or adhesives are also frequently more economical.

Electrically conductive layers, such as sensor electrodes or circuits, are generally generated by sputtering or screen printing.

The touch film is generally connected to an electronic analysis unit, which is necessary for detecting an electrical signal produced by electrical capacitance changes when sensor electrodes are approached and/or touched by an external input unit. The term "electronic analysis unit" here generally comprises electronic components, conductor path structures, solder connections and optionally further components. The electronic analysis unit is generally connected to the control facility of the household appliance.

According to the invention the touch film is preferably configured as flexible and can also be transparent and is preferably made of plastic. It can be configured with one or more layers and can be bonded to the cover disk or injected directly behind using injection molding or injection embossing processes. In one embodiment of the inventive household appliance the at least one sensor electrode or the grid of sensor electrodes is arranged on the film. This allows the at least one sensor electrode or the grid of sensor electrodes to be arranged on the side either facing or facing away from the cover disk.

There is no particular restriction of the arrangement of the touchscreen on the household appliance. However the touchscreen is preferably positioned at an angle of 10° to 45° to a vertical axis on a base surface of the household appliance.

The operating facility configured as a touchscreen can be integrated in an operating panel of the household appliance. The configuration of the operating panel here is not restricted by the invention and can vary depending on the embodiment of the household appliance. However the operating panel is preferably at least partially transparent, particularly preferably made of plexiglass, for example black, but can also be colored. In a further preferred embodiment of the household appliance the operating panel is also arranged at an angle to the housing of the household appliance, preferably an angle of 10° to 45°, particularly preferably 25°. This allows a user to operate the touchscreen easily, particularly in the case of freestanding household appliances, as a user can already see the display on the touchscreen very clearly from a standing, not bending position. Also the user is less likely to be dazzled by reflected light.

In one particularly preferred embodiment of the invention the operating facility is configured as an external touchscreen, in other words in particular as an external mobile user terminal. It is particularly preferable for a tablet computer, smartphone or other mobile user terminal designed to control the household appliance to be used as the touchscreen, as touchscreens are generally also used in smartphones and tablet computers. In a further preferred embodiment of the inventive household appliance the operating facility configured as a touchscreen is therefore integrated in a mobile external user terminal, to which end specific operating software also generally has to be present in the external user terminal. The type of user terminal is therefore not restricted by the invention, as long as it is capable of external data communication.

This allows a user to operate a water-conducting household appliance for example externally and/or to monitor the operation of a household appliance for preparing food, in such a way that it is not necessary to stay at the installation site of the household appliance. For example if a water-conducting household appliance has a dosing system for treatment agent, in one embodiment a user can also check the storage level of treatment agent in the dosing system for example by way of the mobile user terminal. To this end an appropriate display element can be displayed on one or more screen displays on the touchscreen. The term "display element" here refers in particular to an element that only allows a display of information but no user input, in contrast to the term "operating element" also used herein, which refers to an element in which not only can a user provide inputs but information can generally also be supplied.

In a further preferred embodiment of the inventive household appliance it can also be integrated in a home network and be operated by this and/or have its operation monitored by this.

In such instances the control facility of the household appliance has an interface for external data communication.

In a further preferred embodiment the household appliance contains a light sensor for brightness in the room where it is installed and the control facility is designed to control brightness of the touchscreen as a function of the measured brightness in the room. Light sensors are generally used to detect ambient brightness in the form of a light value $L_U$. In a further preferred embodiment of the inventive household appliance a light sensor is therefore also integrated in the household appliance. The light sensor here is not restricted by the invention, as long as it can detect the ambient brightness around the household appliance. The light sensor is connected to the control facility, which preferably increases the brightness of the touchscreen when the ambient brightness decreases and reduces the brightness of the touchscreen when the ambient brightness increases. The control facility here preferably aligns a light value $L_{tar}$ stored in the control facility with the ambient light value $L_U$. This allows a user to operate the touchscreen in a manner that is easy on the eye even when there are different ambient brightness values, for example in dark places and/or at nightfall.

It is generally preferable for touchscreens not to respond to a user's touch all the time. It is desirable for example for a smartphone in a user's pocket not to be touch-sensitive while in there. The same is true of tablet computers for example. This can also prevent use by non-authorized users for example.

In a further preferred embodiment of the inventive household appliance therefore a household appliance is preferred, in which the control facility is designed to block use of the touchscreen after a time interval $t_{Block}$, during which no touch signal generated on the basis of an external input unit has been registered, and only to allow it again after a security input by a user. The security input is not restricted and includes inputs, for example swiping movements or the inputting of security codes to remove a lock screen. This allows a household appliance to have a child lock for example and/or accidental inputs to be prevented. However it can also be possible for a user to select whether or not the blocking of touchscreen operation should be active on the inventive household appliance.

A household appliance for treating objects is generally understood in the present instance to mean an appliance configured to treat household objects, for example laundry items, dishes and food. It can be a large household appliance, for example a washing machine, a washer/dryer, a dishwasher, a cooking appliance, a vacuum cleaner, a refrigeration appliance, a fridge/freezer or an air conditioning unit. It can however also be a small household appliance, for example a coffee machine or a food processor.

A water-conducting household appliance particularly preferably has numerous options for a treatment program to be performed therein, so such a household appliance can be complex for a user to use. The touchscreen provided in the inventive household appliance and its operation to control the household appliance are then particularly advantageous.

The household appliance is therefore preferably a water-conducting household appliance selected from the group comprising washing machine, washer/dryer, tumble dryer and dishwasher. The household appliance is particularly preferably a washing machine or washer/dryer.

A water-conducting household appliance generally has at least one sensor for determining a property of importance for the operation of the household appliance. If the household appliance is a washing machine for example, appropriate sensors could determine the type and quantity of the laundry load and its degree of soiling. In the case of a washer/dryer the sensors could determine the moisture in the laundry for example as well as the type and quantity of the laundry load. The control facility could use such data to evaluate specific procedures and then include such an evaluation in the operation of the household appliance by means of the touchscreen. For example the control facility could block the inputting of a problematic parameter value or problematic combinations of parameter values, in order to prevent damage to delicate laundry items for example.

The subject matter of the invention also includes a method for operating a household appliance for treating objects, having a control facility and an operating facility configured as an external or internal touchscreen, the control facility being designed to display first and second settable control variables of the household appliance as demarcated, flat, touch-sensitive operating elements on the touchscreen on at least two screen displays B1, B2 of different hierarchy, first settable control variables being treatment programs for the objects and second control variables being program parameters with changeable parameter values assigned to the treatment programs, with first operating elements assigned to treatment programs which are selected by touching an assigned first operating element being displayed on a hierarchically higher screen display B1 with a hierarchy H1 and second operating elements that allow the setting of the program parameters being displayed on at least one hierarchically lower screen display B2 with a hierarchy H2<H1, the hierarchically higher screen display B1 being followed indirectly or directly by the hierarchically lower screen display B2 when a first operating element is selected by touching and at least a part of the second operating elements having elongated sensor elements, in the longitudinal direction of which an assigned parameter value changes continuously or non-continuously so that the parameter value can be set by touching the elongated sensor element, and the control facility is designed in such a manner that touching a first operating element between the screen displays B1 and B2 results in a screen display B3, on which at least some of the program parameters and their unchangeable or changeable parameter values are displayed on third operating elements, wherein the screen display B2 results directly or indirectly when a third operating element assigned to a changeable parameter value is touched and the control facility is also configured to allow the direct start of a treatment program on the screen display B1, in that a sub-region of a first operating element provided for this purpose is touched, comprising the steps:

a) Displaying the first screen display B1;
b) Switching to display the second screen display B2, after a treatment program has been selected by touching a first operating element;
c) Modifying a treatment program stored in the control facility based on the program parameter and parameter value settings by touching second operating elements; and
d) Performing the modified treatment program.

The invention has numerous advantages. The advantageous configuration of the touchscreen allows the operation of a household appliance for treating objects and in particular of a water-conducting household appliance to be configured in a more intuitive and clearer manner for a user.

The inventive household appliance not only makes the user more able to communicate with the household appliance in order to perform a treatment program, it also allows better information output to a user in respect of operating statuses or program progress stages, for example in the form of text, image and/or animation. For example a special operating status of the household appliance due to a malfunction can be shown by a flashing red alarm signal. An operating facility configured as a touchscreen therefore not only allows improved and simpler operation, it can also contribute to a higher level of safety, particularly when the touchscreen is integrated in an external device for example, such as a smartphone, so that a user is able to monitor the household appliance even when said user is not in direct proximity to the appliance.

BRIEF DESCRIPTION OF THE SEVERAL VIEWS OF THE DRAWING

Further details of the invention will emerge from the description which follows of non-restrictive embodiments. Reference is made here to FIGS. 1 to 6.

DESCRIPTION OF THE INVENTION

Figure 1:
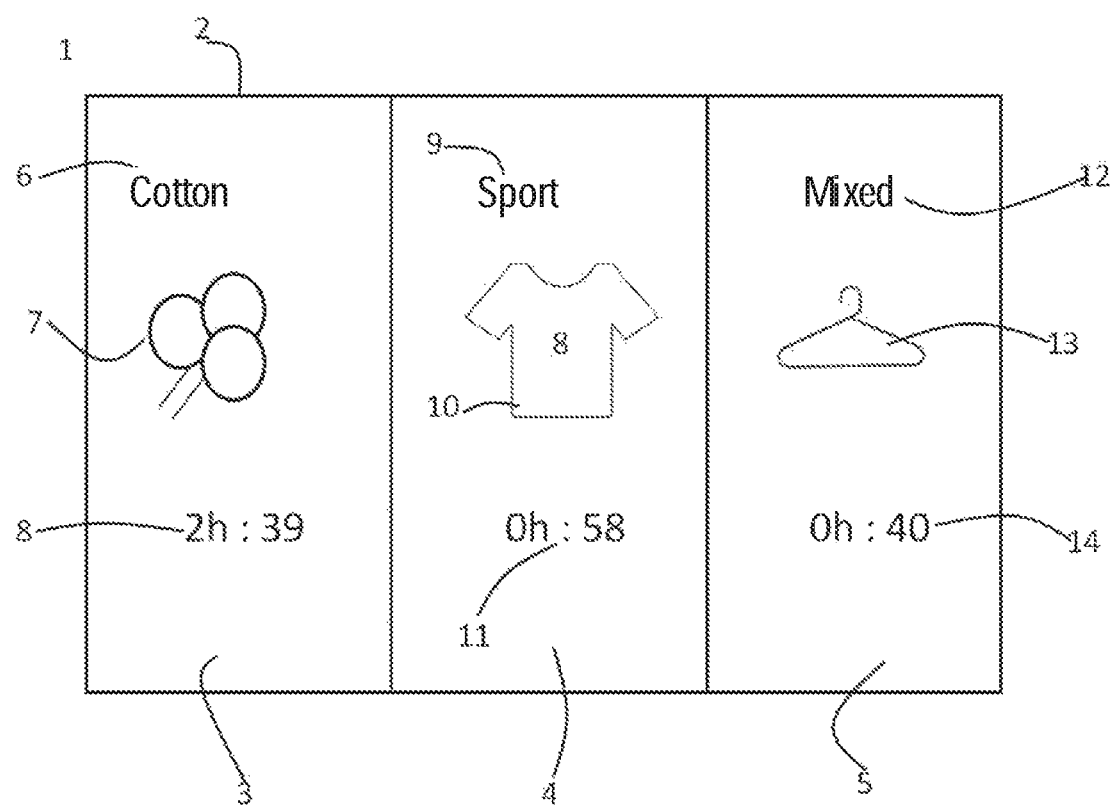
FIG. 1 is a plan view onto a touchscreen with a screen display according to the invention.

FIG. 1 shows a touchscreen 1 of a non-restrictive embodiment of an inventive household appliance, configured as a washing machine in the present embodiment. In the case of the touchscreen 1 in FIG. 1, the entire surface region of the touchscreen 1 is touch-sensitive. FIG. 1 shows a screen display B1 with a high hierarchy, on which three first demarcated, flat, touch-sensitive operating elements 3, 4, 5 are displayed, which are assigned to treatment programs for laundry. Further first operating elements assigned to further treatment programs can be displayed by scrolling left or right. The first operating elements here are all the same size. Symbols 6, 7, 9, 10, 12, 13 are shown in the first operating elements for the respective treatment program, indicating the type of treatment program. The symbols 8, 11 and 14 indicate the duration of the treatment program. First control variables, in other words treatment programs, shown by the symbols 6-8, 9-11 and 12-14, are assigned to the first operating elements 3, 4 and 5 in the control facility of the washing machine. Examples of first control variables shown here are the wash programs "Cotton" 6, "Sport" 9 and "Mixed" 12, both by the text "Cotton" 6 and by the image of a cotton plant 7, the text "Sport" 9, an image of sportswear 10 and the text "Mixed" 12 and an image indicating mixed laundry items 13. The respective runtime of the treatment program is also displayed for a user by the function elements 8, 11, 14. At the same time in the embodiment illustrated here the symbols 8, 11 and 14 stand for separately activatable sub-regions of the operating elements 3, 4, 5 in that the treatment program in question can be started directly, in other words without further setting of program parameters in further display screens, by touching one of said sub-regions. By touching one of said operating elements 3, 4, 5 away from the respective sub-regions 8, 11, 14 a user can switch for example to a second screen display B2 (not shown here), in which the treatment program can be specified more precisely. Alternatively the standard program can be started from the screen display B2 (not shown).

Figure 2:
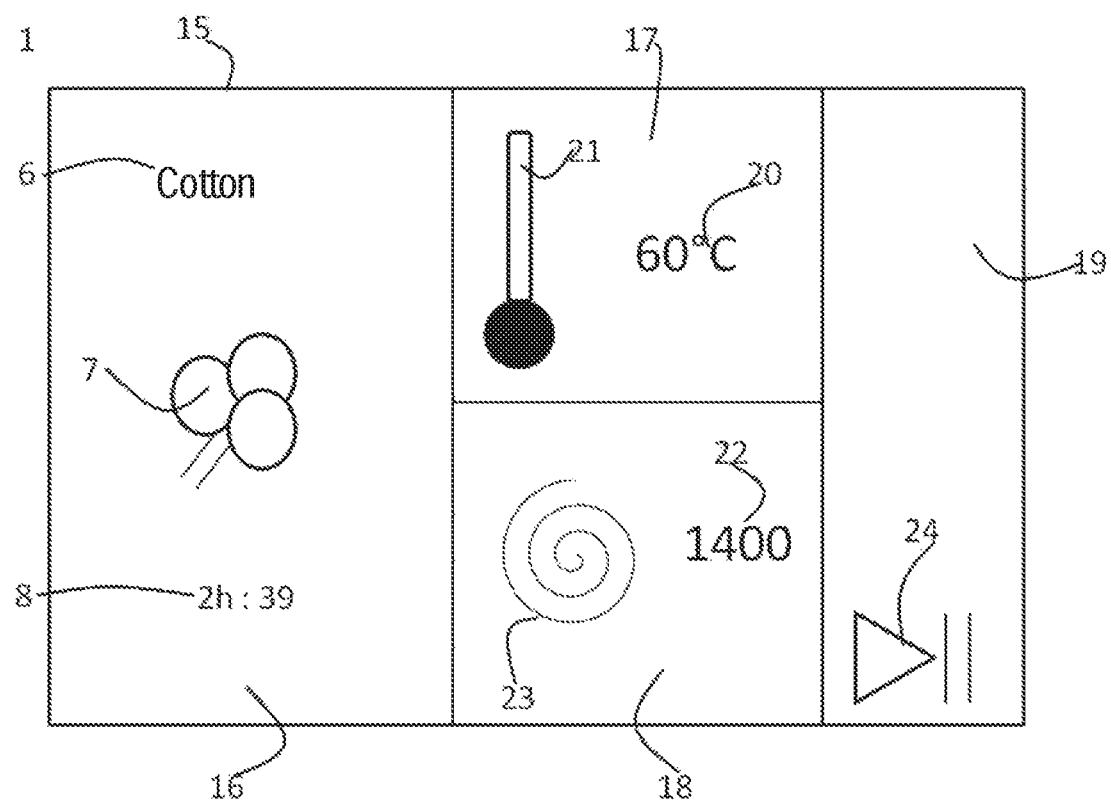
FIGS. 2 to 6 are similar plan views onto the touchscreen with different screen displays.

In FIG. 2 a third screen display B3 15 subdivides the touch-sensitive surface of the touchscreen 1 into four third operating elements 16, 17, 18, 19. The operating element 16 here corresponds to the first operating element 3 from FIG. 1, which is assigned to a treatment program. It uses the symbols text "Cotton" 6, image cotton plant 7 and runtime 8 to display the standard program Cotton selected by a user in the first screen display B1. In the operating elements 17 and 18 the symbols image thermometer and text "60° C." (operating element 17) and text "1400" and image spiral (operating element 18) show program parameters that can be set in principle by a user, parameter values being set by touching one of said operating elements and switching to a new screen display B2 (see FIG. 3). The touchscreen 1 in FIG. 2 allows a treatment program to be started by touching the sub-region 8 in the operating element 16 or by touching the separate operating element 24, which is an on/off or pause operating element.

Figure 3:
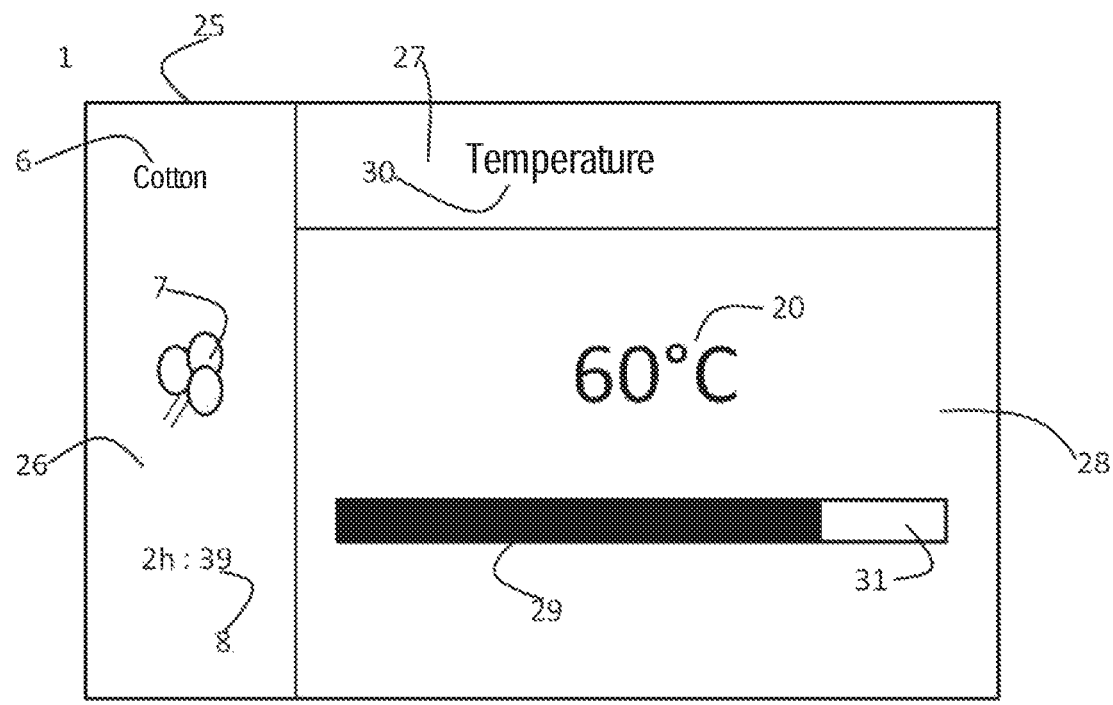

FIG. 3 shows a second screen display B2 25, in which the touch-sensitive surface of the touchscreen 1 is subdivided into three second operating elements 26, 27 and 28, the operating elements 27 and 28 allowing more precise setting of the program parameter temperature, in this instance a wash temperature. The settable program parameter Temperature is shown by the text "Temperature" 30 and the indication of the parameter value "60° C." 20. The value "60° C." here indicates a currently set value. The minimum and/or maximum end value of the temperature can also be displayed in the operating element 28, for example by indicating, in other words displaying, the corresponding numerical values or terms corresponding to said numerical values, for example "cold" for a minimum temperature end value, even though this is not shown in FIG. 3. The currently set value can be displayed larger than said end values, preferably in the center between the two end values. This display option is of course not limited to the parameter "Temperature" but also applies to all settable parameters.

Figure 4:
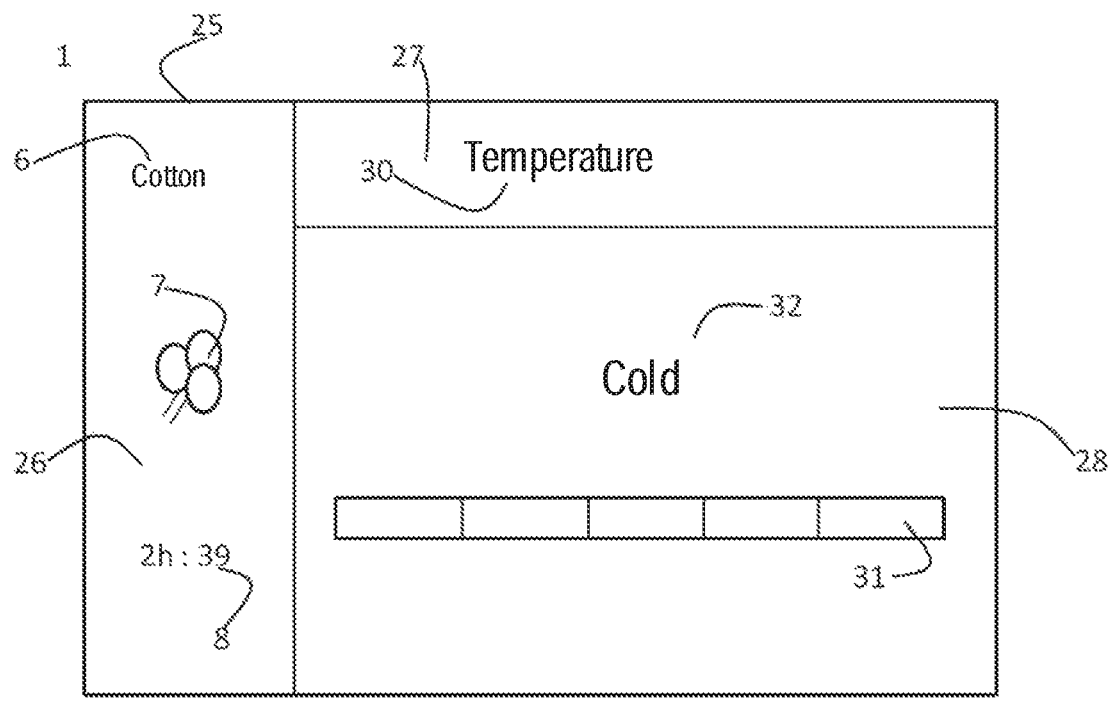

In contrast to FIG. 3, FIG. 4 shows a second temperature setting Cold 32 for the temperature 30.

Figure 5:
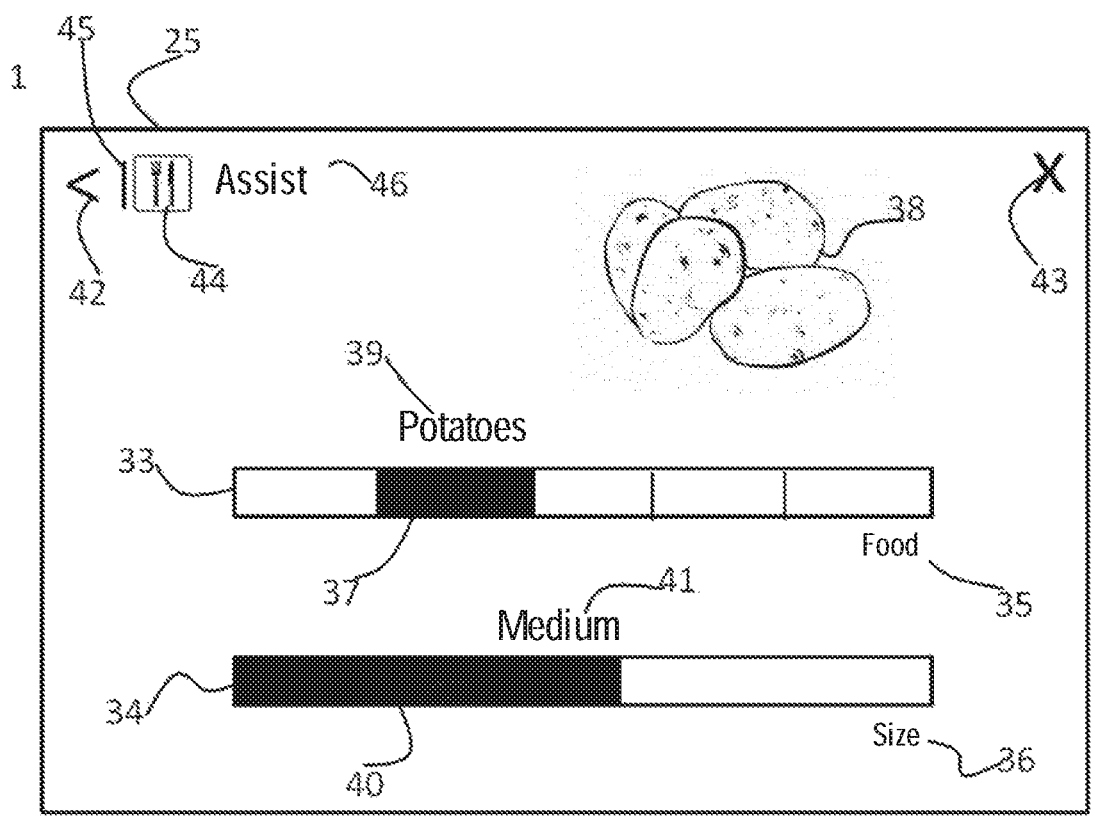

FIG. 5 shows a touchscreen 1 of a non-restrictive embodiment of an inventive household appliance, which is configured as a cooking appliance in the present embodiment. In the case of the touchscreen 1 in FIG. 5 the entire surface region of the touchscreen 1 is touch-sensitive. FIG. 5 shows a second screen display B2 25, in which the touch-sensitive surface of the touchscreen 1 comprises four second operating elements 33, 34, 42 and 43. The second operating elements 33 and 34 here allow more precise setting of the program parameters Food and Size. The program parameters that can be set in each instance are shown to a user by the symbols text "Food" 35 and text "Size" 36 below the operating elements 33 and 34. The second operating elements 33 and 34 are configured in their entirety as elongated sensor elements for setting the program parameters, the first elongated sensor element 33 being a bar with visible segments and the second elongated sensor element 34 being a bar with continuous segments. The user can touch a segment of the bar 33 to select the type of food to be cooked, in this instance potatoes. Touching the bar segment and/or dragging to the bar segment also generates a black region 37, which corresponds to the selected food. The selection made is displayed by a symbol image, in this instance potatoes 38, and a symbol text, in this instance "Potatoes", 39. In this embodiment a user can touch and/or drag the bar 34 to set the size of the selected food. This generates a black region 40, which corresponds to the selection made. At the same time the selection made is displayed by a symbol text, in this instance "Medium", 41. The setting of the higher-order treatment program Food preparation is shown by the symbols image cutlery 44 and text "Assist" 46. The symbol image vertical line 45 here indicates that it is a screen display of lower hierarchy. The separate operating element 42 is shown by the symbol image < and allows the treatment program to be started. The separate operating element 43 is shown by the symbol X and allows the closing of the screen display B2 25.

Figure 6:
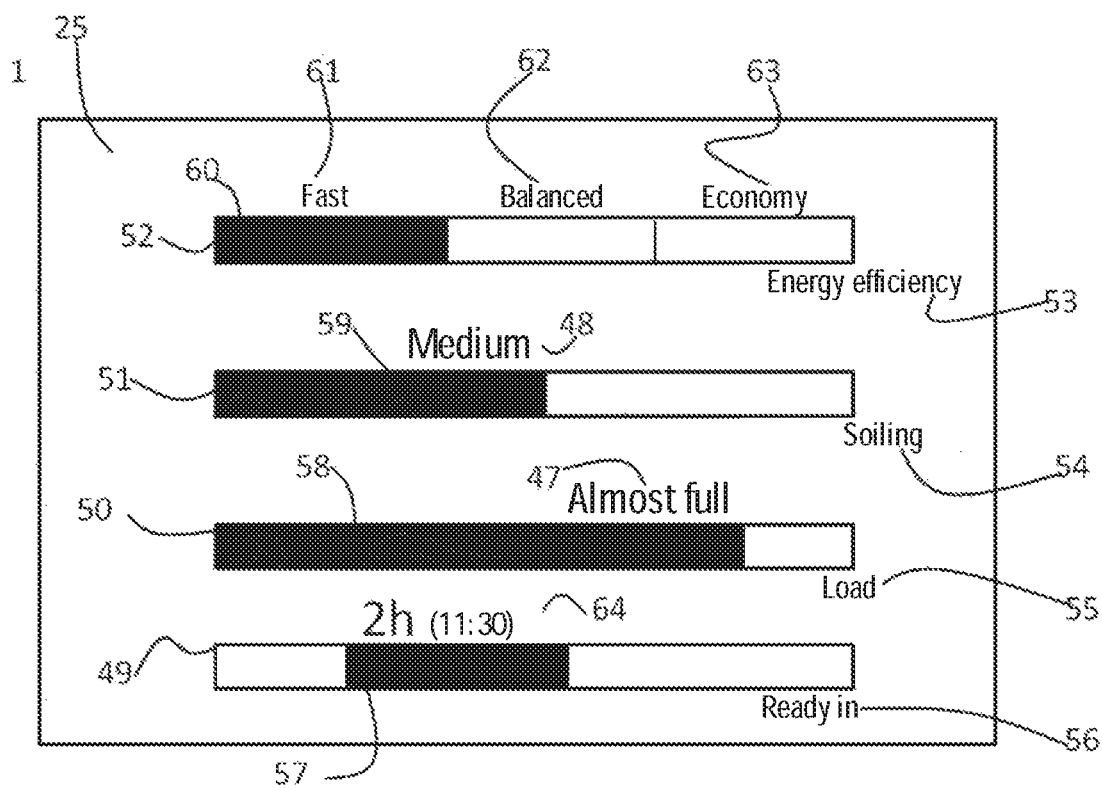

FIG. 6 shows a touchscreen 1 of a non-restrictive embodiment of an inventive household appliance, which is configured as a dishwasher in the present embodiment. In the case of the touchscreen 1 in FIG. 6 the entire surface region of the touchscreen 1 is touch-sensitive. FIG. 6 shows a second screen display B2 25, in which the touch-sensitive surface of the touchscreen 1 has four second operating elements 49, 50, 51 and 52. The operating elements are each configured in their entirety as elongated sensor elements and allow a user to set 4 program parameters more precisely. The segmented bar 52 allows energy efficiency to be set, the settable program parameter being displayed by the symbol text Energy efficiency 53. The segmented bar 52 has 3 visible segments, with a setting option assigned to each segment. This is shown to a user by the 3 symbols text "Fast" 61, text "Balanced" 62 and text "Economy" 63. Touching one of said segments generates a black region 60, which displays the selection made. The continuously segmented bar 51 allows the program parameter Soiling to be set. The program parameter is displayed as the symbol text "Soiling" 54 below the bar 51. A user touches and/or drags the bar to generate a black region 59, which displays the selected setting of the parameter, with a symbol text, in this instance "Medium", 48 also displaying the selection. The continuously segmented bar 50 allows the program parameter Load to be set, being displayed by the symbol text "Load" 55. Here too a user can touch and/or drag the bar to generate a black region 58, which displays the selected setting of the program parameter Load. The setting selected by the user is also displayed by means of the symbol text, in this instance "Almost full", 47. The continuously segmented bar 49 allows the program parameter Delayed start to be set. A user touches and/or drags the bar to generate a black region 57, which corresponds to a delayed start of the treatment program. The runtime and selected end time of the treatment program are displayed to the user as the symbol text Runtime, in this instance "2 h", and time, in this instance "(11:30)", 64. By touching the screen display B2 25 away from the bar, a used can switch to the hierarchy level B1, from which the treatment program can be started.

REFERENCE CHARACTERS

1 Touchscreen
2 Screen display B1
3 First operating element, treatment program Cotton
4 First operating element, treatment program Sportswear
5 First operating element, treatment program Mixed clothing
6 Symbol text Cotton
7 Symbol image cotton plant
8 Symbol indication text Runtime
9 Symbol text Sport
10 Symbol image sportswear
11 Symbol indication text "Runtime"
12 Symbol text "Mixed" for mixed clothing
13 Symbol for treatment program Sport
14 Symbol indication text Runtime
15 Screen display B3
16 Operating element treatment program Cotton
17 Operating element for program parameter Temperature
18 Operating element for program parameter Rotation speed
19 On/off operating element
20 Symbol for temperature, text "60° C."
21 Symbol for temperature, image thermometer
22 Symbol for rotation speed, text "1400"
23 Symbol for program parameter Rotation speed, image spiral
24 On/off operating element, touch-sensitive sub-region
25 Screen display B2
26 Operating element treatment program Cotton
27 Operating element with indication of settable program parameter
28 Operating element for setting program parameter Temperature
29 Generated, set temperature value on elongated sensor element
30 Symbol text "Temperature"
31 Elongated sensor element, bar
32 Symbol text "Cold"
33 Sensor element bar for setting program parameter Food
34 Sensor element bar for setting program parameter Size
35 Symbol text "Food"
36 Symbol text "Size"
37 Generated, set parameter Food
38 Symbol image potatoes
39 Symbol text "Potatoes"
40 Generated, set parameter Size
41 Symbol text "Medium"
42 Operating element for starting treatment program with symbol image <
43 Operating element for closing screen display B2 with symbol image X
44 Symbol image cutlery
45 Symbol image vertical line
46 Symbol text "Assist"
47 Symbol text "Almost full"
48 Symbol text "Medium"
49 Sensor element bar for setting program parameter Delayed start
50 Sensor element bar for setting program parameter Load
51 Sensor element bar for setting program parameter Soiling
52 Sensor element bar for setting program parameter Energy efficiency
53 Symbol text "Energy efficiency"
54 Symbol text "Soiling"
55 Symbol text "Load"
56 Symbol text "Ready in"
57 Generated, set parameter Delayed start
58 Generated, set parameter Load
59 Generated, set parameter Soiling
60 Generated, set parameter Energy efficiency
61 Symbol text "Fast"
62 Symbol text "Balanced"
63 Symbol text "Economy"
64 Symbol text 2 h (11:30)

The invention claimed is:

1. An apparatus, comprising:
a household appliance for treating objects, the appliance including:
a control facility and an operating facility, said operating facility being a touchscreen;
said control facility being configured to display on said touchscreen first and second tenable control variables of the household appliance in a form of demarcated, flat, touch-sensitive operating elements on said touchscreen on at least two screen displays B1, B2 of different hierarchy;
said first settable control variables being treatment programs for the objects to be treated and second settable control variables being program parameters with changeable parameter values assigned to the treatment programs;
wherein first operating elements assigned to treatment programs which are selected by touching an assigned first operating element are displayed on a hierarchically higher screen display B1 with a hierarchy H1 and second operating elements that allow a setting of said program parameters are displayed on at least one hierarchically lower screen display B2 with a hierarchy H2<H1;

wherein said hierarchically higher screen display B1 is followed by the hierarchically lower screen display B2 when a first operating element is selected by touching and at least a part of said second operating elements has elongated sensor elements, in a longitudinal direction of which an assigned parameter value changes so that the parameter value can be set by touching the elongated sensor element;

said control facility being configured so that touching a first said operating element on screen display B1 results in a screen display B3; on which at least some of the program parameters and their parameter values are displayed on third operating elements, wherein the screen display B2 results when a third operating element assigned to a changeable parameter value on screen display B3 is touched;

said control facility being configured to enable a direct start of a treatment program on said screen display B1, when a sub-region of a first operating element provided for the purpose is touched;

said control facility configured to use acoustic signals to indicate at least one item selected from the group consisting of a performance of a treatment program and a transition between two program stages wherein the acoustic signals indicating the performance of the treatment program are output during the performance of the treatment program; and said control facility configured such that a frequency or intensity of the acoustic signals is a function of a type of program stage being performed or a transition between two program stages, wherein said control facility has stored therein a relationship between the frequency or intensity of the acoustic signals and the type of program stage being performed or a transition between two program stages.

2. The apparatus according to claim 1, wherein:
said operating facility is an internal touchscreen;
said hierarchically higher screen display B1 is followed directly by the hierarchically lower screen display B2 when the first operating element is selected, and the assigned parameter value of the elongated sensor elements changes continuously or non-continuously;
the program parameters and their parameter values displayed by said screen display B3 on the third operating elements are changeable or unchangeable parameter values;
the screen display B2 results directly when the third operating element assigned to a changeable parameter value is touched.

3. The apparatus according to claim 1, wherein said control facility is configured to use visual signals to indicate at least one item selected from the group consisting of a performance of a treatment program and a transition between two program stages.

4. The apparatus according to claim 3, wherein a performance of a treatment program is displayed on said touchscreen by an image display that changes over time, and wherein an assignment between the treatment programs and the changing image displays is stored in said control facility.

5. The apparatus according to claim 4, wherein said control facility is configured such that an intensity of the visual signals is a function of a type of program stage being performed or a transition between two program stages, wherein said control facility has stored therein a relationship between the intensity of the visual signals and the type of program stage being performed or a transition between two program stages.

6. The apparatus according to claim 1, wherein said operating elements are touch switches with capacitive sensor elements.

7. The apparatus according to claim 1, further comprising a base surface of the household appliance, and wherein said touchscreen is positioned at an angle of 10° to 45° to a vertical axis on said base surface.

8. The apparatus according to claim 1, wherein said operating facility is an external touchscreen separate from said control facility.

9. The apparatus according to claim 8, wherein said operating facility is a tablet computer or smartphone designed for controlling the household appliance.

10. The apparatus according to claim 1, wherein said sound generator and said speaker are configured for generating and playing acoustic signals related to treatment programs.

11. The apparatus according to claim 1, further comprising a light sensor for sensing a brightness level in a room wherein the household appliance is installed and wherein said control facility is configured to control a brightness of said touchscreen as a function of the measured brightness in the room.

12. The apparatus according to claim 1, wherein said control facility is designed to block use of the touchscreen after a time interval $t_{Block}$, during which no touch signal generated by an external input unit has been registered, and to thereafter allow a use of the touchscreen only after a security input by a user.

13. The apparatus according to claim 1, wherein the household appliance is a water-conducting household appliance selected from the group consisting of a washing machine, a washer/dryer, a tumble dryer and a dishwasher.

14. The apparatus according to claim 13, wherein the household appliance is a washing machine or a washer/dryer.

15. The apparatus according to claim 1, wherein the control facility is configured such that the intensity of the acoustic signals is a function of a type of program stage being performed or a transition between two program stages.

16. A method of operating a household appliance for treating objects,
wherein the household appliance has a control facility and an operating facility configured as an external or internal touchscreen;
wherein the control facility is configured to display first and second settable control variables of the household appliance as demarcated, flat, touch-sensitive operating elements on the touchscreen on at least two screen displays B1, B2 of different hierarchy, wherein first settable control variables are treatment programs for the objects to be treated and second settable control variables are program parameters with changeable parameter values assigned to the treatment programs;
wherein first operating elements assigned to treatment programs which are selected by touching an assigned first operating element are displayed on a hierarchically higher screen display B1 with a hierarchy H1 and second operating elements that allow a setting of the program parameters are displayed on at least one hierarchically lower screen display B2 with a hierarchy H2<H1;

wherein the hierarchically higher screen display B1 is followed indirectly or directly by the hierarchically lower screen display B2 when a first operating element is selected by touching and at least a part of the second operating elements has elongated sensor elements, in the longitudinal direction of which an assigned parameter value changes continuously or non-continuously so that the parameter value can be set by touching the elongated sensor element;

wherein the control facility is designed in such a manner that touching a first operating element on screen display B1 results in a screen display B3, on which at least some of the program parameters and their unchangeable or changeable parameter values are displayed on third operating elements, wherein the screen display B2 results directly or indirectly when a third operating element assigned to a changeable parameter value on screen display B3 is touched and the control facility is also configured to allow the direct start of a treatment program on the screen display B1, in that a sub-region of a first operating element provided for this purpose is touched;

wherein the control facility is configured to use acoustic signals to indicate at least one item selected from the group consisting of a performance of a treatment program and a transition between two program stages, wherein the acoustic signals indicating the performance of the treatment program are output during the performance of the treatment program; and wherein the control facility is configured such that a frequency or intensity of the acoustic signals is a function of a type of program stage being performed or a transition between two program stages, wherein the control facility has stored therein a relationship between the frequency or intensity of the acoustic signals and the type of program stage being performed or a transition between two program stages; and the method comprising:

a) displaying the first screen display B1;

b) switching to display the second screen display B2, after a treatment program has been selected by touching a first operating element;

c) modifying a treatment program stored in the control facility based on the program parameter and parameter value settings by touching second operating elements to define a modified treatment program; and d) performing the modified treatment program.

17. The method according to claim 16, wherein the household appliance is a washing machine or a washer/dryer.

18. The method according to claim 16, wherein the control facility is configured such that the intensity of the acoustic signals is a function of a type of program stage being performed or a transition between two program stages.

* * * * *